(12) United States Patent
Fader et al.

(10) Patent No.: US 6,792,681 B2
(45) Date of Patent: Sep. 21, 2004

(54) FORGED IN-LINE TUBULAR PROCESS

(75) Inventors: Joseph A. Fader, Brighton, MI (US); Muhammad Salim, Windsor (CA)

(73) Assignee: Meritor Suspension Systems Company, Inc., Troy, MI (US)

( * ) Notice: Subject to any disclaimer, the term of this patent is extended or adjusted under 35 U.S.C. 154(b) by 0 days.

(21) Appl. No.: 10/157,647

(22) Filed: May 29, 2002

(65) Prior Publication Data

US 2003/0221316 A1 Dec. 4, 2003

(51) Int. Cl.[7] .............................................. B21D 53/88
(52) U.S. Cl. ...................... 29/897.2; 29/414; 29/417; 29/430; 29/558; 29/33 T
(58) Field of Search .................... 29/897, 897.2, 29/897.312, 890.053, 414, 415, 417, 430, 525.14, 557, 558, 33 D, 33 T, 33 Q; 72/51, 52, 168, 370.1, 370.23–370.26, 370.27; 228/173.4, 173.6, 173.7, 160

(56) References Cited

U.S. PATENT DOCUMENTS

| | | | | |
|---|---|---|---|---|
| 2,817,364 A | * | 12/1957 | Crawford | 138/171 |
| 4,372,576 A | * | 2/1983 | Inoue | 267/273 |
| 4,378,122 A | * | 3/1983 | Ohno et al. | 267/273 |
| 4,429,899 A | * | 2/1984 | Ohno et al. | 267/273 |
| 4,781,054 A | * | 11/1988 | Brown et al. | 72/306 |
| 4,796,797 A | * | 1/1989 | Nakako et al. | 228/144 |
| 4,854,150 A | * | 8/1989 | Brown et al. | 72/369 |
| 5,756,167 A | * | 5/1998 | Tamura et al. | 428/31 |

FOREIGN PATENT DOCUMENTS

| | | |
|---|---|---|
| DE | 19640568 A1 | * 10/1996 |
| DE | 19749902 A1 | * 11/1997 |

* cited by examiner

*Primary Examiner*—Charles T. Jordan
*Assistant Examiner*—T. Nguyen
(74) *Attorney, Agent, or Firm*—Carlson, Gaskey & Olds, P.C.

(57) ABSTRACT

A method of forming a stabilizer bar is provided that includes the steps of roll forming sheet metal coil into a continuous tube. Next, a first portion of the continuous tube is flattened. The first portion of the continuous tube is sheared to define a first end. Next, a second portion of the continuous tube is flattened. The continuous tube is sheared at the second portion to define a final unit length with a second end opposite the first end. That is, the length is sheared from the rest of the continuous tube. The final length is the length is needed to form a single stabilizer bar. Finally, the final unit length is deformed into the desired stabilizer bar shape.

10 Claims, 1 Drawing Sheet

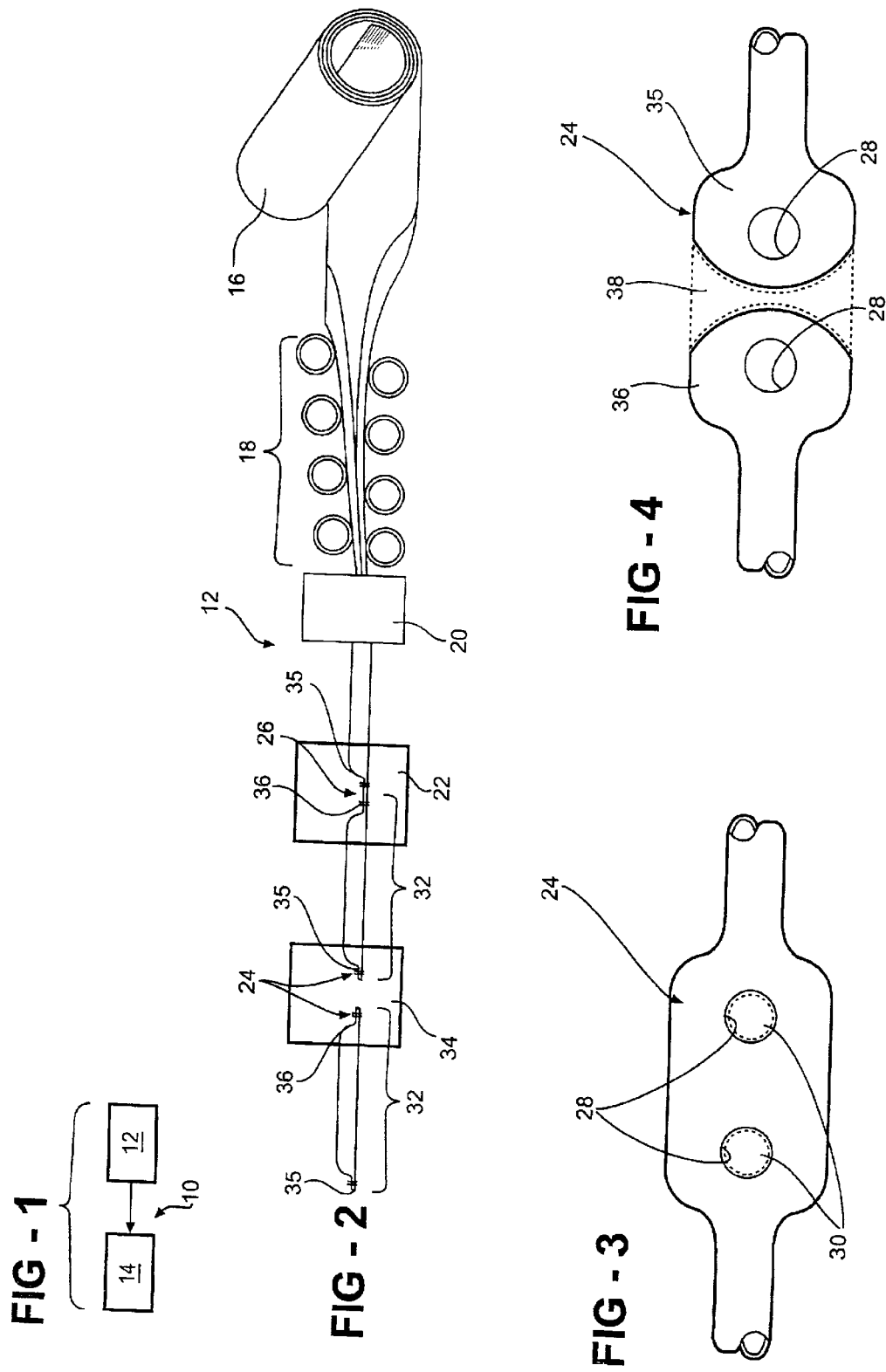

FORGED IN-LINE TUBULAR PROCESS

BACKGROUND OF THE INVENTION

This invention relates to an in-line forging process for forming tubular members into stabilizer bars.

The stabilizer bars are manufactured using a rather costly multi-stage process. For example, tubular material is typically sheared or cut and eyes are forged onto the tubular bar off line. The eyes are used to connect the ends of the stabilizer bar to vehicle suspension components. Forming the eyes has been a separate process and involves substantial cost and material handling.

More specifically, a metal coil is roll formed into a tube. The tube is then sheared into lengths approximately 18 feet. A stabilizer bar typically only requires approximately 6 feet of material. The 18 foot length is then sent to a separate station where it is cut to 6 foot lengths. Each of the 6 foot lengths are then sent to another station for forging of the eyes on the ends of the 6 foot length tube. Eyes are then hot forged onto the ends and trimmed. The 6 foot length is then sent to another station for forming the length into the shape of a stabilizer bar. Prior art stabilizer forming processes have been very costly as a result of numerous material handling operations. Therefore, what is needed is a new process that reduce material handling by combining processes.

SUMMARY OF THE INVENTION AND ADVANTAGES

The present invention provides a method of forming a stabilizer bar including the steps of roll forming sheet metal coil into a continuous tube. Next, a first portion of the continuous tube is flattened. The first portion of the continuous tube is sheared to define a first end. Next, a second portion of the continuous tube is flattened. The continuous tube is sheared at the second portion to define a final unit length with a second end opposite the first end. That is, the length is sheared from the rest of the continuous tube. The final length is the length is needed to form a single stabilizer bar. Finally, the final unit length is deformed into the desired stabilizer bar shape.

Accordingly, the above invention provides a new process that reduce material handling by combining processes.

BRIEF DESCRIPTION OF THE DRAWINGS

Other advantages of the present invention can be understood by reference to the following detailed description when considered in connection with the accompanying drawings wherein:

FIG. 1 is a schematic view of the present invention process depicting the forming process for the stabilizer bar blank and the stabilizer forming process;

FIG. 2 is a schematic view of the final unit length stabilizer bar blank forming process;

FIG. 3 is a view of a portion of the continuous tube subsequent to the forging operation and preceding the shearing operation; and FIG. 4 is a top elevational view of the portion shown in FIG. 3 subsequent to the shearing operation.

DETAILED DESCRIPTION OF THE PREFERRED EMBODIMENT

A highly schematic depiction of a stabilizer bar manufacturing process 10 is shown in FIG. 1. The process 10 includes the present invention final unit length stabilizer bar blank forming process 12 and the stabilizer bar forming process 14. The stabilizer bar blank forming process 12 yields blanks severed from a continuous longitudinal member, such as tubing, such that the blank is of a final unit length that may be used for the final product, such as a stabilizer bar. For example, if a 6 foot length of tubing is required to form a stabilizer bar, then a 6 foot length is severed from the continuous tube. This is contrasted from the prior art in which much longer lengths were severed from the continuous tube and then subsequently severed into shorter lengths for additional processing.

The stabilizer blank forming process 12 is shown in more detail in FIG. 2. A continuous sheet of metal coil 16 may be fed into one end of the forming process 12. By continuous it is meant that the coil have a significantly greater length then the length required for each stabilizer bar enabling an effectively continuous forming process.

A conventional roll forming device 18 is used to form a sheet metal coil 16 into a continuous longitudinal member. A welding device 20, such as an electric resistance welder, welds the seam created when forming the tube. An in-line forging device 22 forges or flattens a portion of the tube. The forging device 22 engages the portion of the tube and then moves along with the tube at the rate the tube is fed through the process, as is known in the art. The device 22 then returns to a predetermined location to forge the next portion of the continuous tube. Each portion will define first 35 and second 36 ends. A pair of holes 28 may be formed in the flattened portion with the forging device 22 by punching out an offal 30, as shown in FIG. 3. One hole of the flattened portion will form an eye at the ends 35 and 36 of the stabilizer bar.

As the tube is fed through the process, the portion comes to a shearing device 34 that shears the tube at the flatten portion between the holes 28. The tube may be trimmed during the shearing operation generating an offal 38, as shown in FIG. 4. Additionally, the holes 28 may be formed by the shearing device 34.

While a first portion 24 is at the shearing device 34, simultaneously a second portion 26 is being forged at the forging device 22. The length of tubing between the first 24 and second 26 portions defines a final unit length 32 that is used to form a single stabilizer bar during the stabilizer bar forming process 14. Said another way, single unit lengths are generated by each shearing operation. Once a final unit length 32 has been severed by the shearing device 34, the first 35 and second 36 ends of the length 32 have been forged flat with holes 28 so that the length 32 need only be deformed into the desired stabilizer shape.

Accordingly, the present invention provides a continuous forming process that eliminates numerous material handling operations thereby reducing the overall cost of the stabilizer bar. The forged eyes are formed in-line as part of a continuous process. Unit lengths are severed from the continuous tube that may immediately be used in the stabilizer bar forming process without performing any intermediate operations.

The holes 28 may also be provided or preformed in the sheet metal coil 16. It is to be understood that all the present invention is described as using a sheet metal coil for forming hollow tubing, a solid coil may also be used. Additionally, the present invention process may also be used to form articles of manufacture other than stabilizer bars.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of continuously forming a stabilizer bar comprising the steps of:
    a) roll forming sheet metal coil into a generally continuous tube;
    b) flattering a first portion of the generally continuous tube;
    c) shearing the generally continuous tube at the first portion and defining a first end;
    d) flattening a second portion of the generally continuous tube;
    e) shearing the generally continuous tube at the second portion defining a final unit length with a second end opposite the first end;
    f) deforming the final unit length into a stabilizer bar; and
    wherein steps b) and d) include punching a pair of holes in each of the first and second portions, and wherein steps c) and e) include shearing the tube at the first and second portions between the pair of holes, wherein one hole is arranged in a first portion or a second final unit length and the other hole is arranged in the second portion of the final unit length.

2. A method of continuously forming a longitudinal member with an end connection comprising the steps of:
    a) providing a generally continuous longitudinal member;
    b) flattering a first portion of the continuous longitudinal member;
    c) shearing the continuous longitudinal member at the first portion and defining a first end subsequent to performing step b);
    d) flattening a second portion of the continuous longitudinal member;
    e) shearing the continuous longitudinal member at the second portion defining a final unit length with a second end opposite the first end subsequent to performing step d); and
    f) deforming the final unit length into a desired final product shape.

3. The method according to claim 2, wherein step a) includes roll forming sheet metal coil into a tube to provide the continuous longitudinal member.

4. The method according to claim 3, wherein step a) includes welding a seam in the tube.

5. The method according to claim 3, wherein the sheet metal coil includes pre-punched holes.

6. The method according to claim 2, wherein the desired final product shape of step f) is a stabilizer bar.

7. The method according to claim 2, wherein steps b) and d) occur simultaneously.

8. The method according to claim 2, wherein steps c) and e) occur simultaneously.

9. A method of continuously forming a longitudinal member with an end connection comprising the steps of:
    a) providing a generally continuous longitudinal member;
    b) flattering a first portion of the continuous longitudinal member;
    c) shearing the continuous longitudinal member at the first portion and defining a first end subsequent to performing step b);
    d) flattening a second portion of the continuous longitudinal member;
    e) shearing the continuous longitudinal member at the second portion defining a final unit length with a second end opposite the first end subsequent to performing step d);
    f) deforming the final unit length into a desired final product shape; and
    wherein steps b) and d) include punching a pair of holes in each of the first and second portions, and wherein steps c) and e) include shearing the tube at the first and second portions between the pair of holes, wherein one hole is arranged in the first portion of a second final unit length and the other hole is arranged in the second portion of the final unit length.

10. A method of continuously forming a longitudinal member with an end connection comprising the steps of:
    a) providing a generally continuous longitudinal member;
    b) flattering a first portion of the continuous longitudinal member;
    c) shearing the continuous longitudinal member at the first portion and defining a first end subsequent to performing step b);
    d) flattening a second portion of the continuous longitudinal member;
    e) shearing the continuous longitudinal member at the second portion defining a final unit length with a second end opposite the first end subsequent to performing step d);
    f) deforming the final unit length into a desired final product shape, and
    wherein performing step c) provides a discrete length and performing step e) provides the final unit length less than the discrete length, wherein step c) is performed subsequent to step c).

* * * * *

UNITED STATES PATENT AND TRADEMARK OFFICE
CERTIFICATE OF CORRECTION

PATENT NO. : 6,792,681 B2
DATED : September 21, 2004
INVENTOR(S) : Fader et al.

It is certified that error appears in the above-identified patent and that said Letters Patent is hereby corrected as shown below:

<u>Column 4,</u>
Line 51, "step c)" should read as -- step e) --.

Signed and Sealed this

Seventh Day of December, 2004

JON W. DUDAS
*Director of the United States Patent and Trademark Office*